United States Patent
Shibuya et al.

[11] Patent Number: 6,001,165
[45] Date of Patent: Dec. 14, 1999

[54] COATING COMPOSITION FOR RECORDING MATERIAL AND PROCESS FOR PRODUCING RECORDING MATERIAL

[75] Inventors: Nobuhiro Shibuya; Toshiyuki Hirabe; Koichi Asami, all of Ibaraki; Masahiro Satoh, Shiga; Hajime Kanbara, Kyoto, all of Japan

[73] Assignee: Oji-Yuka Synthetic Paper Co., Ltd., Tokyo, Japan

[21] Appl. No.: 09/103,810

[22] Filed: Jun. 24, 1998

[30] Foreign Application Priority Data

Jun. 24, 1997 [JP] Japan ..................................... 9-181839

[51] Int. Cl.⁶ .................................................. C09D 201/00
[52] U.S. Cl. ................................ 106/287.17; 106/170.51; 106/194.1; 106/287.16; 162/164.1; 162/164.6; 162/158; 162/177; 162/135; 524/381
[58] Field of Search ........................ 106/287.17, 170.51, 106/287.16, 194.1; 162/164.1, 164.6, 158, 177, 135; 524/381

[56] References Cited

U.S. PATENT DOCUMENTS 5,166,035  11/1992  Kanno et al. .
5,292,364   3/1994  Hiraiwa et al. ...................... 106/287.1

FOREIGN PATENT DOCUMENTS 0 736 392  10/1996  European Pat. Off. .
44 05 969   8/1995  Germany .

OTHER PUBLICATIONS

Patent Abstracts of Japan, vol. 014, No. 389 (P–1095), Aug. 22, 1990, JP 02 146550, (Jun. 5, 1990).
Chemical Abstracts, vol. 98, No. 12, Mar. 21, 1983, JP 57–040865, (Aug. 31, 1982).

*Primary Examiner*—David Brunsman
*Attorney, Agent, or Firm*—Oblon, Spivak, McClelland, Maier & Neustadt, P.C.

[57] ABSTRACT

A coating composition for a recording material and a process for producing the recording material are provided, wherein the coating composition includes an aluminum alkoxide, a binder and a hydrophilic solvent.

19 Claims, No Drawings

COATING COMPOSITION FOR RECORDING MATERIAL AND PROCESS FOR PRODUCING RECORDING MATERIAL

BACKGROUND OF THE INVENTION

1. Field of the Invention

This invention relates to a coating composition for a recording material and to a process for producing a recording material using the same. More particularly, it relates to a coating composition used in the production of recording materials suited to aqueous ink jet recording and a process for producing such recording materials using the coating composition.

2. Discussion of the Background

Transfer recording materials used in ink jet printing or copying generally include a polyolefin resin film. However, an ink jet recording system using aqueous ink, an ink receiving layer must be provided because a polyolefin film, if used alone, repels aqueous ink and results in poor printing quality or requires a long time for the ink to dry. Conventional aqueous ink-receiving recording materials for ink jet recording have a substrate that is coated with a water-soluble or dispersible binder having dispersed therein inorganic fine powder (see JP-A-55-51583, JP-A-62-174182, JP-A-3-284978, and JP-A-7-89216, the term "JP-A" as used herein means an "unexamined published Japanese patent application") or have a substrate coated with a porous layer of hydrated alumina (see JP-A-2-276670 and JP-A-2-276671).

Ideally, ink-absorbing particles should allow the ink to penetrate rapidly, which allows the ink to dry rapidly. Accordingly, porous particles having a large void content, such as porous silica powder and alumina sol, have been heretofore regarded as suitable. However, the state-of-the-art recording materials that have inorganic fine powder or alumina sol on their surfaces do not meet the current demand for high speed ink drying necessary with the improved recording speeds and advanced multicolor (six-color) printing systems of the latest ink jet recording equipment.

SUMMARY OF THE INVENTION

Accordingly, one object of this invention is to provide a coating composition for producing a recording material for ink jet printers which absorbs ink rapidly, does not blot, and exhibits satisfactory water resistance.

Another object of the present invention is to provide a process for producing a recording material for ink jet printers.

These and other objects of the present invention have been attained by a coating composition that includes an aluminum alkoxide, a binder, and a hydrophilic solvent.

Accordingly, the first embodiment of the present invention relates to a coating composition that includes an aluminum alkoxide, a binder, and a hydrophilic solvent.

The second embodiment of the present invention relates to a recording material obtained by coating a substrate with a coating composition that includes an aluminum alkoxide, a binder, and a hydrophilic solvent, followed by drying.

The third embodiment of the present invention relates to a process for producing a recording material that includes coating a substrate with a coating composition that contains an aluminum alkoxide, a binder, and a hydrophilic solvent and drying the coating composition.

BRIEF DESCRIPTION OF THE PREFERRED EMBODIMENTS

Other features of the present invention will become apparent in the course of the following description of the preferred embodiments, which are not intended to be limiting.

Preferably, the binder is present in an amount of $0.2\alpha$ to $40\alpha$ parts by weight per 100 parts by weight of the alumina alkoxide, wherein $\alpha$ represents (6000/molecular weight of the aluminum alkoxide).

Preferably, the hydrophilic solvent is present in an amount of 300 to 10,000 parts by weight per 100 parts by weight of the aluminum alkoxide.

Preferably, the composition further comprises a superabsorbent polymer.

Preferably, the superabsorbent polymer is present in an amount of 0.1 to 150 parts by weight per 100 parts by weight of the aluminum alkoxide.

Preferably, the composition further contains a stabilizer.

Preferably, the stabilizer is present in an amount of 0.005 to 1 mol per mole of the aluminum alkoxide.

Preferably, the composition further contains 0.1 to 150 parts by weight of an alkoxysilane per 100 parts by weight of the aluminum alkoxide.

Preferably, the composition further contains a crosslinking agent in an amount of $0.2\alpha$ to $40\alpha$ parts by weight per 100 parts by weight of the aluminum alkoxide, wherein $\alpha$ represents (6000/molecular weight of the aluminum alkoxide), the amount of the crosslinking agent being equal to or less than the amount of the binder.

Preferably, the composition further contains 0.01 to 2 mol of water per mole of the aluminum alkoxide.

A recording material is preferably obtained by coating a substrate with the coating composition of the invention followed by drying.

A process for producing a recording material preferably includes coating a substrate with the coating composition of the invention followed by drying.

According to the present invention, the hydrated alumina functioning as an ink absorbing component on a substrate is the one that has been converted from an aluminum alkoxide dissolved in a coating composition through sol-gel reaction after application to the substrate and therefore has a small particle size and an increased void content.

The sol-gel reaction of the aluminum alkoxide of the coating composition can be controlled in the presence of a stabilizer. In this case, the storage stability of the coating composition can be improved, and the particle size of the hydrated alumina can be controlled.

Further, the ink drying properties can be improved greatly by incorporating a superabsorbent polymer into the coating composition thereby achieving improvement in image density.

Preferably, the coating composition includes, a hydrophilic solvent and an aluminum alkoxide represented by the formula (1):

$$R^1_{(3-n)}Al(OR^2)_n \tag{1}$$

wherein $R^1$ and $R^2$ each represent an alkyl group having 1 to 6 carbon atoms; and n represents 2 or 3, in the form of sol, the aluminum alkoxide being converted to hydrated alumina through sol-gel reaction while or after being applied on a substrate.

Preferred examples of the aluminum alkoxide represented by formula (1) include aluminum triisopropoxide, aluminum tributoxide, aluminum triethoxide, aluminum tri-sec-butoxide, mono-sec-butoxyaluminum diisoproxide, di-sec-butoxyaluminum monoisopropoxide, mono-sec-butoxyaluminum di-n-butoxide, di-sec-butoxyaluminum mono-n-butoxide, aluminum tri-n-propoxide, isopropoxyaluminum di-n-propoxide, diisopropoxyaluminum n-propoxide, diisopropoxyaluminum monoisospropoxyaluminum diethoxide, di-sec-butoxyaluminum monomethoxide, diisopropoxyaluminum monomethoxide, diisopropoxyaluminum monohexyloxide, mono-n-propoxyaluminum diethoxide, di-n-propoxyaluminum monoethoxide, nono-sec-butoxyaluminum diethoxide, di-sec-butoxyaluminum monoethoxide, aluminum tripentyloxide, aluminum ethyldiisopropoxide, aluminum ethyldiethoxide, aluminum ethyldibutoxide, aluminum isopropyldiethoxide, and aluminum methyldiethoxide. More preferred aluminum alkoxides include aluminum triisopropoxide, aluminum tri-sec-butoxide, aluminum triethoxide, and mono-sec-butoxyaluminum diisopropoxide.

The binder which can be used in the present invention preferably includes hydroxypropyl cellulose, cellulose acetate, polyvinylformamide, styrene-maleic anhydride copolymers, styrene-alkyl acrylate copolymers, polyvinyl alcohol, ethylenevinyl alcohol copolymers, silanol-containing ethylene-vinyl alcohol copolymers, polyvinylpyrrolidone, ethylene-vinyl acetate copolymers or partial saponification products thereof, methylethyl cellulose, oxidized starch, polyethylene polyamine, polyester, polyacrylamide, vinyl acetate copolymers, cation-modified polyurethane resins, and tertiary nitrogen-containing acrylic resins (see JP-A-62-148292, the entire contents of which are hereby incorporated by reference). More preferred binders include polyvinylpyrrolidone, polyvinyl alcohol, polyvinylformamide, and hydroxypropyl cellulose.

The amount of the binder is not particularly limiting and is preferably selected according to the kind and amount of the aluminum alkoxide and preferably ranges 0.2α to 40α parts by weight, particularly 2α to 8α parts by weight, per 100 parts by weight of the aluminum alkoxide (these ranges includes all values and subranges there between), wherein α is a value obtained by dividing 100 parts by weight (of the aluminum alkoxide) by the molecular weight of the aluminum alkoxide and multiplying the quotient (corresponding to the mole number of the aluminum alkoxide) by 60, i.e., α=6000/molecular weight of the aluminum alkoxide.

The hydrophilic solvent which can be used in the present invention preferably includes methanol, ethanol, 1-propanol, 2-propanol, isobutyl alcohol, tert-butyl alcohol, dimethyl ether, diethyl ether, dipropyl ether, diisopropyl ether, dibutyl ether, anisole, phenetole, methoxytoluene, dioxane, trioxane, furan, 2-methylfuran, tetrahydrofuran, diethylene glycol dimethyl ether, diethylene glycol diethyl ether, acetone, methyl ethyl ketone, 2-pentanone, 3-pentanone, 2-hexanone, methyl isobutyl ketone, methyl acetate, ethyl acetate, propyl acetate, formamide, methylformamide, and dimethylformamide. These solvents can be used either individually or as a mixture of two or more thereof. More preferred solvents include tetrahydrofuran, butanol, isopropyl alcohol, ethyl alcohol, dimethylformamide, dimethyl ether, diethyl ether, and methyl ethyl ether.

The amount of the hydrophilic solvent to be used is not particularly limiting and is preferably decided according to the kind of the aluminum alkoxide or the kind or amount of the binder and preferably ranges from 300 to 10,000 parts by weight, particularly 900 to 4,000 parts by weight, per 100 parts by weight of the aluminum alkoxide. These ranges include all values and subranges therebetween.

It is preferable for the coating composition of the present invention to contain a superabsorbent polymer. Preferably, the superabsorbent polymer which can be used in the present invention is a particulate polymer capable of absorbing 5 to 2000 times, preferably 100 to 1500 times, as much water as its own weight. These ranges include all values and subranges therebetween. Specific examples of suitable superabsorbent polymers are crosslinked sodium polyacrylate, crosslinked lithium polyacrylate, crosslinked potassium polyacrylate, vinyl alcohol-acrylamide copolymers, sodium acrylate-acrylamide copolymers, hydrolyzate or acrylic acid-grafted polymers of carboxymethyl cellulose, acrylic acid-grafted cellulose or acrylonitrile grafted starch, isobutylene-maleic anhydride copolymers, vinyl alcohol-acrylic acid copolymers, polyethylene oxide-modified polymers, polydiallyldimethylammonium salts, and polyacrylate quaternary ammonium salts. These polymers can be used either individually or as a combination of two or more thereof. More preferred polymers include crosslinked sodium polyacrylate and isobutylene-maleic anhydride copolymers, with crosslinked sodium polyacrylate being most preferred.

The superabsorbent polymer particles suitably have an average particle size of 0.1 to 50 μm. These particles are sized according to methods typically known in the art. For obtaining uniform and rapid ink absorptivity and high resolving power, a preferred average particle size is 0.5 to 30 μm, particularly 1 to 20 μm. These ranges include all values and subranges therebetween.

The amount of the superabsorbent polymer is selected appropriately according to the kind of the aluminum alkoxide or the kind or amount of the binder and preferably ranges from 0.1 to 150 parts by weight, particularly 10 to 120 parts by weight, per 100 parts by weight of the aluminum alkoxide. These ranges include all values and subranges therebetween. If it is less than 0.1 part, the effect in accelerating ink drying is insubstantial.

If it exceeds 150 parts, the recording material tends to blot, and the strength of the coating layer is considerably impaired.

The coating composition of the present invention can contain a stabilizer for improving the storage stability. Suitable stabilizers include β-keto-acid esters, such as methyl acetoacetate, ethyl acetoacetate, propyl acetoacetate, butyl acetoacetate, hexyl acetoacetate, methyl propanoylacetate, ethyl propanoylacetate, propyl propanoylacetate, butyl propanoylacetate, ethyl butanoylacetate, methyl benzoylacetate, and ethyl benzoylacetate; β-keto-acids, such as acetoacetic acid, propanoylacetic acid, butanoylacetic acid, and benzoylacetic acid; compounds having a β-ketone structure, such as β-diketones, e.g., acetylacetone, propanoylacetone, butanoylacetone, pentanoylacetone, hexanoylacetone, benzoylacetone, pentane-3,5-dione, and octane-3,5-dione; and aluminum chelate compounds, such as methylacetoacetatolaluminum diisopropylate, ethylacetoacetatoaluminum diisopropylate, propylacetoacetatoaluminum diisopropylate, isopropylacetoacetatoaluminum diisopropylate, butylaetoacetatoaluminum diisopropylate, hexylacetoacetatoaluminum diisopropylate, sec-butylacetoacetatoaluminum diisopropylate, methylacetoacetatoaluminum di-sec-butylate, ethylacetoacetatoaluminum di-sec-butylate, propylacetoacetatoaluminum di-sec-butylate, isopropylacetoacetatoaluminum di-sec-butylate, butylacetoacetatoaluminum di-sec-butylate sec-butylacetoacetatoaluminum di-sec-butylate, acetylacetonatobis(ethylacetoacetato)aluminum, tris(ethylacetoacetato)aluminum, tris(acetylacetonato) aluminum, and isopropoxyoleyloxy (ethylacetoacetato) aluminum. The compounds having a β-diketone structure, particularly esters of aliphatic β-keto-acids are preferred among them. These stabilizers can be used either individually or as a combination of two or more thereof.

The amount of the stabilizer to be used is not particularly limiting and is preferably decided based on the mole number of the aluminum alkoxide (the amount in grams divided by the molecular weight). The stabilizer is used in an amount of 0.05 to 1 mol, preferably 0.05 to 0.7 mol, still preferably 0.2 to 0.6 mol, per mole of the aluminum alkoxide. These ranges include all values and subranges therebetween. If the amount of the stabilizer is less than 0.05 mol, the stabilizing effect is insubstantial. If it is more than 1 mol, the sol-gel reaction will be retarded, which is industrially disadvantageous.

It is preferable for the coating composition to further contain an alkoxysilane as an ink drying accelerator. The alkoxysilane which can be used is represented by formula (2):

$$R^3_{4-n}Si(OR^4)_n \qquad (2)$$

wherein $R^3$ represents an alkyl group having 1 to 8 carbon atoms or a group having a carbon—carbon double bond; $R^4$ represents an alkyl group having 1 to 8 carbon atoms; and n represents an integer of 1 to 4.

Examples of the alkoxysilanes of formula (2) wherein $R^3$ is an alkyl group are tetramethoxysilane, tetraethoxysilane, tetrapropoxysilane, tetrahexyloxysilane, tetra-2-ethylhexyloxysilane, and butyltriethoxysilane. Examples of those in which $R^3$ is a group having a carbon—carbon double bond are vinyltrimethoxysilane, vinyltriethoxysilane, vinyltri-n-propoxysilane, vinyltriisopropoxysilane, vinyltri-n-butoxysilane, vinyldimethoxyethoxysilane, vinylmethoxydiethoxysilane, vinyltris(2-methoxyethoxy) silane, 3-methacryloxypropyltrimethoxysilane, 3-methacryloxypropyltriethoxysilane, allyltriethoxysilane, triphenoxyvinylsilane, diethoxy-2-piperidinoethoxyvinylsilane, dimethoxyphenoxyvinylsilane, vinyltris(trimethylsiloxy) silane, diethoxymethylvinylsilane, 3-methacryloxypropyldimethoxymethylsilane, ethoxydimethylvinylsilane, dimethylisobutoxyvinylsilane, dimethylfurfuryloxyvinylsilane, dimethylisopentyloxyvinylsilane, diphenylethoxyvinylsilane, p-styryltrimethoxysilane, and m-styryltrimethoxysilane. Those in which $R^3$ is a group having a carbon—carbon double bond are preferred for obtaining a tough coating layer. Still preferred are vinyltrimethoxysilane, vinyltriethoxysilane, vinyltri-n-butoxysilane, and 3-methacryloxypropyltrimethoxysilane. Vinyltrimethoxysilane and 3-methacryloxypropyltrimethoxysilane are particularly preferred. These alkoxysilane compounds can be used either individually or as a combination of two or more thereof Preferably, the alkoxysilane compound is used in an amount of 0.1 to 150 parts by weight, preferably 10 to 120 parts by weight, per 100 parts by weight of the aluminum alkoxide. These ranges include all values and subranges therebetween. If the amount is less than 0.1 part, the drying accelerating effect is insufficient. If it is more than 150 parts, the recording material tends to blot.

It is preferable for the coating composition to further contain a crosslinking agent having a plurality of ethylenically unsaturated groups per molecule.

Such a crosslinking agent includes ethylene glycol diacrylate or dimethylacrylate (acrylate and methylacrylate are hereinafter inclusively referred to as (meth)acrylate), 1,3-propanediol di(meth)acrylate, 1,2-propanediol di(meth) acrylate, 1,4-butanediol di(meth)acrylate, diethylene glycol di(meth)acrylate, tetraethylene glycol di(meth)acrylate, hexanediol di(meth)acrylate, tripropylene glycol di(meth) acrylate, ethylene oxide-modified bisphenol A di(meth) acrylate, trimethylolpropane tri(meth)acrylate, propylene oxide-modified trimethylolpropane tri(meth)acrylate, pentaerythritol tri(meth)acrylate, pentaerythritol tetra(meth) acrylate, ditrimethylolpropane tetra(meth)acrylate, dipentaerythritol penta(meth)acrylate, dipentaerythritol hexa (meth)acrylate, diallyl phthalate; polyfunctional oligomers having a molecular weight of 1,000 to 10,000 obtained by reacting a polyhydric alcohol, such as propane-1,2-diol, propane-1,2,3-triol, pentaerythritol, 2-methylpropane-1,2,3-triol, and ditrimethylolpropane, with a polyester oligomer containing an aliphatic or aromatic component and esterifying the terminal with (meth)acrylic acid; polyfunctional oligomers having a molecular weight of 1,000 to 10,000 obtained by reacting a polyhydric alcohol, such as propane-1,2-diol, propane-1,2,3-triol, pentaerythritol, 2-methylpropane-1,2,3-triol, and ditrimethylolpropane, with an unsaturated polyester oligomer with or without the terminal thereof esterified with (meth)acrylic acid; and polyfunctional oligomers having molecular weight of 1,000 to 10,000 obtained by reacting a polyhydric phenol, such as bisphenol A, bisphenol F, and 2,2,2-tri(4-hydroxyphenyl) ethane, with epichlorohydrin and esterifying the terminal of the resulting oligomer with (meth)acrylic acid. These crosslinking agents can be used either individually or as a combination of two or more thereof. Preferred crosslinking agents include polyfunctional oligomers having a molecular weight of 1,000 to 10,000 obtained by reacting pentaerythritol with a polyester oligomer containing an aliphatic or aromatic component and esterifying the terminal with (meth)acrylic acid and polyfunctional oligomers having a molecular weight of 1,000 to 10,000 obtained by reacting bisphenol A with epichlorohydrin and esterifying the terminal of the resulting oligomer with (meth)acrylic acid.

The amount of the crosslinking agent if added is $0.2\alpha$ to $40\alpha$ parts by weight, preferably $2\alpha$ to $8\alpha$ parts by weight, per 100 parts by weight of the aluminum alkoxide, wherein $\alpha$ is as defined above, and is equal to or less than the amount of the binder, preferably not more than half the amount of the binder. These ranges include all values and subranges therebetween. If it is less than $0.2\alpha$ parts, the crosslinking effect is insubstantial. If it is more than $40\alpha$ parts, the resulting recording material becomes slow in ink absorbing or drying. The same tendency results if the amount of the crosslinking agent is more than that of the binder.

To improve the strength of the coating layer or the adhesion of the coating layer to the substrate, a hydroxyl-containing unsaturated compound is preferably used in combination with the above-identified crosslinking agent. The hydroxyl-containing unsaturated compound contains a hydroxyl group and an unsaturated group, i.e., a carbon—carbon double bond copolymerizable with the crosslinking agent, per molecule.

Suitable hydroxyl-containing unsaturated compounds include hydroxyl-containing α,β-unsaturated carboxylic acid esters, such as 2-hydroxylethyl (meth)acrylate, 2-hydroxypropyl (meth)acrylate, 2,3-dihydroxypropyl (meth)acrylate, 2,2-bishydroxymethyl-3-hydroxypropyl (meth)acrylate, butanediol mono(meth)acrylate, tetrahydrofurfuryl (meth)acrylate, and a (meth)acrylate of an ethylene glycol oligomer having 4 to 40 carbon atoms; N-methylolacrylamide, N-methylolmethacrylamide; di(2-hydroxyethyl) maleate, di(2-hydroxypropyl) maleate, bis(2, 3-dihydroxypropyl) maleate, bis(2-hydroxymethyl-2- hydroxypropyl) maleate, bis(2,2-dihydroxymethyl-3-hydroxypropyl) maleate, and their corresponding fumarates; mono- or di-ester between maleic acid or fumaric acid and an ethylene glycol or propylene glycol oligomer having 4 to 40 carbon atoms; allyl alcohol, crotyl alcohol, 4-(2-hydroxyethyl)styrene, 3-(2-hydroxyethyl)styrene, 4-(hydroxymethyl)styrene, 3-(hydroxymethyl)styrene, 4-hydroxystyrene, and 3-hydroxystyrene.

The hydroxyl-containing unsaturated compounds can be used either individually or as a combination of two or more thereof. In particular, 2-hydroxyethyl (methacrylate) and 2-hydroxypropyl (meth)acrylate are preferred for their effect in improving the strength of the coating layer.

The amount of the hydroxyl-containing unsaturated compound if added is $0.2\alpha$ to $40\alpha$ parts by weight, preferably $2\alpha$ to $8\alpha$ parts by weight, per 100 parts by weight of the aluminum alkoxide, wherein $\alpha$ is as defined above, and is equal to or less than the amount of the binder, preferably not more than half the amount of the binder. These ranges include all values and subranges therebetween. If it is less than $0.2\alpha$ parts, the effect in improving the strength or adhesion of the coating layer is insubstantial. If it is more than $40\alpha$ parts, the resulting recording material becomes slow in ink absorbing or drying. The same tendency results if the amount of the compound is more than that of the binder.

If desired, the coating composition can contain other monomers that are reactive or polymerizable with the above-described crosslinking agent. Preferred examples of useful monomers include (meth)acrylate, such as methyl (meth)acrylate, ethyl (meth)acrylate, propyl (meth)acrylate, isopropyl (meth)methacrylate, butyl (meth)acrylate, hexyl (meth)acrylate, 2-ethylhexyl (meth)acrylate, cyclohexyl (meth)acrylate, octyl (meth)acrylate, and lauryl (meth)acrylate, aromatic vinyl compound, such as styrene, $\alpha$-methylstyrene, $\alpha$-methoxystyrene, dimethylstyrene, 2,4,6-trimethylstyrene, chlorostyrene, dichlorostyrene, bromostyrene, nitrostyrene, chloromethylstyrene, cyanostyrene, t-butylstyrene, and vinylnaphthalene; cyanovinyl compounds, such as acrylonitrile and methacrylonitrile, vinyl esters, such as vinyl acetate; vinyl ethers, such as methyl vinyl ether, ethyl vinyl ether, and butyl vinyl ether; and heterocyclic vinyl compounds. These monomers can be used either individually or as a combination of two or more thereof. They can be used in an amount not more than 20% by weight based on the crosslinking agent, more preferably not more than 15% by weight based on the crosslinking agent. These ranges include all values and subranges therebetween.

Preferably, the coating composition can contain a polymerization initiator for increasing the efficiency of radical polymerization initiation of the crosslinking agent which is induced by ultraviolet rays, electron beam or ionizing radiation. Examples of useful polymerization initiators include benzoin compounds, such as 1-hydroxycyclohexylphenyl ketone, benzoin, benzoin methyl ether, benzoin ethyl ether, and benzoin isopropyl ether; acetophenone compounds such as diethoxyacetophenone and 4-phenoxydichloroacetophenone; and thioxanthone compounds, such as thioxanthone and 2-chlorothioxanthone.

The initiator can be used in an amount of 0.05 to 20 parts by weight, preferably 1 to 15 parts by weight, per 100 parts by weight of the aluminum alkoxide. These ranges include all values and subranges therebetween. If used in an amount of less than 0.05 part, the initiator produces only an insufficient effect. If the amount exceeds 20 parts, the coating composition tends to undergo color change after being applied to a substrate.

The aluminum alkoxide contained in the coating composition is converted into aluminum oxide on hydrolysis. Water necessary for the hydrolysis may be present in the coating composition, or it may be supplied during or after application to a substrate. Moisture in air may be utilized, or the atmosphere may be humidified. Water can also be supplied in the form of microcapsules capable of releasing water.

The amount of water necessary for the hydrolysis can be expressed quantitatively, i.e., in terms of mole number, where it is added before or during application. That is, not more than 2 mol, preferably not more than 1.2 mol, of water is added per mole of the aluminum alkoxide. These ranges include all values and subranges therebetween. Addition of 2 mol or more of water reduces storage stability of the coating composition. Even if the amount of water added is below the stoichiometric amount required for the hydrolysis of the aluminum alkoxide and the subsequent condensation reaction, moisture in the surrounding air diffuses into the coating layer during and after the application to make the reaction proceed.

Preferably, the coating composition of the present invention is prepared by dissolving the essential components and optional components in the hydrophilic solvent in various manners. For example, the components are added to the solvent either successively or all at once and stirred; each component is separately dissolved in a hydrophilic solvent, and the solutions are mixed together; at least one of the components and the rest of the components are separately dissolved in a hydrophilic solvent, and the solutions are mixed together; a thick or concentrated solution of the components is prepared and then diluted to an appropriate concentration, or a thin or dilute solution of the components is prepared and then adjusted to an appropriate concentration by removing part of the solvent. The manner of dissolving the components is not particularly limiting and can be chosen in conformity with the production process or conditions.

Where the components are successively dissolved in a solvent in a container, it is preferable to inhibit the hydrolysis of the aluminum alkoxide during the preparation by adding the components to the hydrophilic solvent in the order, a binder, a stabilizer (if desired), an aluminum alkoxide, a small amount of water, and a superabsorbent resin.

Preferably, the recording material according to the present invention is produced by coating a substrate with the above-described coating composition to a coating weight of 0.3 to 30 $g/m^2$, preferably 1 to 15 $g/m^2$, in terms of the aluminum alkoxide and evaporating the hydrophilic solvent to form a thin film of a porous hydrated aluminum having a thickness of 0.1 to 20 $\mu$m, preferably 0.5 to 15 $\mu$m and more preferably 1 to 10 $\mu$m. These ranges include all values and subranges therebetween.

The aluminum alkoxide applied to a substrate absorbs moisture in the air or the water already present in the composition and is hydrolyzed and condensed to form a porous boemite or pseudoboemite layer comprising aluminum oxide, aluminum hydroxide, etc.

Taking aluminum tri-sec-butoxide for an instance as in Examples 1 and 6 hereinafter given, the sol-gel reaction is represented by the following reaction scheme:

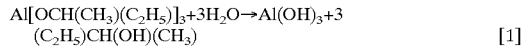

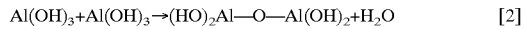

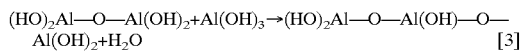

Where the coating composition contains the alkoxysilane represented by formula (2), the alkoxysilane absorbs moisture in air or the water present in the composition and is hydrolyzed. The hydrolyzed alkoxysilane is condensed by itself or with the aluminum alkoxide hydrolyzed in the same system to form a coating layer comprising silicon oxide, hydrated silicon, aluminum oxide, aluminum hydroxide, an aluminum-silicon complex hydroxide.

Taking 3-methacryloylpropyltrimethoxysilane for an instance as in Example 4 hereinafter given, the above reactions are represented by the following reaction scheme:

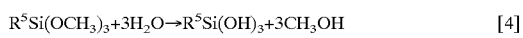

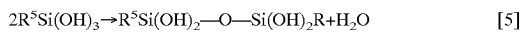

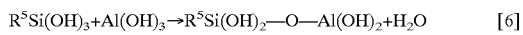

wherein $R^5$ represents a 3-methacryloylpropyl group.

The substrate which is coated with the coating composition to provide a recording material having improved printability with aqueous ink is not particularly limited an includes plastic films, metal foil, metallized paper, laminated paper, coated paper, and paper. Suitable plastic films include films of polypropylene, polyethylene, polyester or polycarbonate. For use on electrophotographic copiers, heat resistant films of polyester, polysulfone, cellulose esters, polyamide or polyimide are preferred.

A microporous stretched film of a thermoplastic resin containing fine inorganic particles is also useful as a substrate. This film has a void content of 5 to 50%, preferably 10 to 40%, as expressed by equation:

Void content (%)=$((\rho_0-\rho)/\rho_0) \times 100$ wherein $\rho_0$ is the density of an unstretched resin film; and $\rho$ is the density of stretched resin film. These ranges include all values and subranges therebetween.

Such a microporous stretched film preferably includes the following embodiments (1) to (5).

(1) A biaxially stretched film of a thermoplastic resin containing 8 to 65% by weight of an organic or inorganic filler (see JP-B-54-31032 (the term "JP-B" as used herein means an "examined published Japanese patent application"), U.S. Pat. Nos. 3,775,521, 4,191,719, 4,377,616 and 4,560,614), the entire contents of each of which are hereby incorporated by reference.

(2) Synthetic paper comprising a biaxially stretched thermoplastic resin film as a base layer and a uniaxially stretched film of a thermoplastic resin containing 8 to 65% by weight of fine inorganic powder as a paper-like layer (see JP-B-46-40794, JP-A-57-149363, JP-A-57-181829), the entire contents of each of which are hereby incorporated by reference.

In addition to the above-described two-layer structure, the synthetic paper of this type can have a three-layer structure having the paper-like layer on each side of the base layer (see JP-B-46-40794), a three- to seven-layer structure having other resin film layers between the paper-like layer and the base layer (see JP-B-50-29738, JP-A-57-149363, JP-A-56-126155, and JP-A-57-181829) or a three (or more)-layer structure having, on the back side thereof, a heat-sealable layer comprising a resin having a lower melting point than the base layer resin, such as propylene-ethylene copolymer, a metal salt (e.g., Na, Li, Zn or K salt) of an ethylene-(meth) acrylic acid copolymer, and chlorinated polyethylene (see JP-B-3-13973), the entire contents of each of which are hereby incorporated by reference.

The three-layered synthetic paper is a laminate composed of a biaxially stretched resin film as a base layer and, as a paper-like layer, a uniaxially stretched film having a large number of microvoids on both sides of the base layer, which is obtained by uniaxially stretching a thermoplastic resin film containing 0 to 50% by weight of fine inorganic powder at a temperature below the melting point to prepare a base layer, laminating on both sides of the base layer a molten thermoplastic resin film containing 8 to 65% by weight of fine inorganic powder, and stretching the laminate in the direction perpendicular to the stretching direction of the base layer.

(3) Printable glossy synthetic paper having the structure of the synthetic paper described in (2) above which additionally has on the paper-like layer thereof a transparent thermoplastic resin layer containing no inorganic powder and having a thickness of 0.1 to 20 µm (see JP-B-4-60437, JP-B-1-6041 1, and JP-A-61-3748), the entire contents of each of which are hereby incorporated by reference.

Such synthetic paper includes one comprising a composite film as a substrate having provided on the surface side thereof a transparent film layer containing no inorganic powder and further provided thereon a primer layer having an antistatic function, in which the composite film comprises a biaxially stretched thermoplastic resin film as a base layer having provided on both sides thereof a uniaxially stretched thermoplastic film layer containing 8 to 65% by weight of fine inorganic powder (see JP-A-61-3748, the entire contents of which are hereby incorporated by reference), and one comprising a biaxially stretched thermoplastic resin film as a base layer having on at least one side thereof a laminate composed of a uniaxially stretched thermoplastic resin film containing 8 to 65% by weight of fine inorganic powder as a paper-like layer and a uniaxially stretched thermoplastic resin film as a surface layer, wherein the thickness (t) of the surface layer satisfies the following relationship:

$$R \geq t \geq (1/10) \times R \qquad (2)$$

wherein R is the average particle size of the fine inorganic powder present in the paper-like layer (see JP-B-1-60411), the entire contents of which are hereby incorporated by reference.

The above-described multilayered synthetic paper can have a heat-sealable layer on the back side thereof as in the synthetic paper described in (2) above.

(4) A composite sheet comprising the synthetic paper described in (1) through (3) above, which is backed with woven fabric or plain weave via an adhesive, the woven fabric being woven from 50 to 140, preferably 60 to 100, of warp threads and the same number of weft threads both having a fineness of 50 to 150 denier, preferably 50 to 100 denier, per 2.54 cm in a plain weave and having a basis weight of 50 to 200 g/m², preferably 75 to 100 g/m² (see U.S. Pat. No. 5,494,735), the entire contents of which are hereby incorporated by reference. These ranges include all values and subranges therebetween.

Materials of the warp and weft of the woven fabrics include nylon 6, nylon 6,6, polyethylene terephthalate, cotton, rayon, polyacrylonitrile, polyfluoroethylene, polypropylene, and polyvinylidene fluoride. The warp and weft threads may be the same or different.

Liquid anchor coating agents can be used as an adhesive. Useful anchor coating agents include polyurethane type anchor coating agents, such as EL-150 or a mixture of BLS-2080A and BLS-2080B (all trade names, produced by Toyo Morton K.K.), and polyester type anchor coating agents, such as AD-503 (a tradename, produced by Toyo Morton K.K.). The anchor coating agent is applied to a spread of 0.5 to 25 g/m², preferably 0.75 to 20 g/m². These ranges include all values and subranges therebetween.

A hot-melt adhesive, such as an ethylene-vinyl acetate copolymer, low-density polyethylene, a metal salt of an ethylene-(meth)acrylic acid copolymer (Surlyn), chlorinated polyethylene and chlorinated polypropylene, can also be used. It should be noted, however, that the stretched resin film may shrink on use of the hot-melt adhesive unless the melting point of the hot-melt adhesive is lower than the stretching temperature adopted in the preparation of the stretched resin film.

In using the anchor coating agent, it is applied to either the woven fabric or the stretched resin film, and they are stuck to each other under pressure with a roll. In using a hot-melt adhesive, it is extrusion-laminated on either the woven fabric or the stretched resin film from a die, and they are adhered to each other under pressure with a roll. A film of a molten adhesive may be laminated on non-woven fabric made up of entangled short fibers, on which the stretched resin film can be adhered under pressure with a roll.

(5) Composite synthetic paper comprising the synthetic paper described in (1) through (3) above, which is backed with a fibrous reinforcing sheet (nonwoven sheet) with the adhesive described in (4) above (see JP-B-3-74180), the entire contents of which are hereby incorporated by reference.

The method for preparing the nonwoven sheet by press heating a nonwoven web of entangled short fibers is known (see JP-B-37-4993, JP-A-53-10704, JP-A-53-90404, JP-A-53-119305, JP-A-53-122803, JP-A-56-15500, JP-A-57-29700, JP-A-57-39299, JP-A-59-70600, JP-A-57-61796, and JP-A-57-139597), the entire contents of each of which are hereby incorporated by reference.

The nonwoven sheet is usually prepared by making an aqueous dispersion of split short fibers (thickness: 0.2 to 15 denier; length: 1 to 20 mm) of thermoplastic resins, such as polyethylene, polypropylene, polyamide, and polyester, into a web by the use of a wire paper machine or a cylinder paper machine, and heat pressing the fiber web with a roll set at 120 to 270° C. under a pressure of 5 to 200 kg/cm². Such a nonwoven sheet is available under the tradename of Spunbond #Unicel (B type or BT type) from Teijin Ltd. and the tradename of Spunbond #Jolt WF from Idemitsu Petrochemical Co., Ltd.

The aqueous dispersion of short fibers may contain 10 to 90% by weight of pulp-like particles of aromatic polyamide or aromatic polyester. The aqueous dispersion may also contain 5 to 30% by weight of a fibrous polyvinyl alcohol or a powdered thermoplastic resin, such as polyethylene, polyester, polyamide or polypropylene, as a binder for the short fibers. These ranges include all values and subranges therebetween. It can further contain pigments, plasticizers, tack modifiers, dispersants and the like.

The nonwoven sheet preferably has a basis weight of 12 to 80 g/m². If the basis weight is less than 12 g/m², the anticurl properties are insufficient. Basis weights exceeding 80 g/m² produce no further improvement in anticurl properties, only resulting in increase of cost.

A thermoplastic resin powder or sheet can be scattered or laminated on a nonwoven fiber web prepared by the paper making technique, followed by heat pressing into an integral nonwoven sheet. Materials of the thermoplastic resin powder or sheet include polyethylene, polypropylene, polyvinyl chloride, polyvinylidene chloride, polystyrene, styrene-butadiene-acrylonitrile copolymers, polyamide, copolyamide, polycarbonate, polyacetal, polymethyl methacrylate, polysulfone, polyphenylene oxide, polyester, copolyester, polyphenylene sulfide, polyether ester ketone, polyether sulfone, polyether imide, polyamide-imide, polyimide, polyurethane, polyether esters, polyether amide, and polyester amide. These resins may be used either individually or as a mixture of two or more thereof A nonwoven sheet obtained by the process disclosed in JP-B-48-32986, the entire contents of which are hereby incorporated by reference, is also useful in a backing sheet. According to the process disclosed, a web comprising at least 75% by weight of randomly arranged filaments of crystalline and oriented synthetic polymer having a fiber suitable diameter is exposed to a heated fluid that does not melt the filaments so that the filaments are self-bonded at a large number of their intersections with spacings from each other. The process is characterized in that the self-bonding of the filaments is conducted by exposing the web to a fluid having at least atmospheric pressure at a bonding temperature falling within a range of $T_x(1\pm0.03)°$ C., wherein $T_x$ is a critical bonding temperature, while controlling the temperature variation of the web in three dimensions within 5° C. and restricting the web under only a light compressive force enough to control the shrinkage of the filaments at that bonding temperature within 20% and to control the reduction in birefringence of the filaments within 50%. After the self-bonding, the restricting force is not removed until the temperature of the web is dropped to a temperature at which the filaments do not shrink any more. Such a nonwoven sheet is commercially available from E. I. du Pont, U.S.A. under the tradename of Tyvek.

Thermoplastic resins which can be used in the above-described synthetic paper described in (1) through (5) above as a stretched film include polyolefin resins, e.g., polyethylene, polypropylene, an ethylene-propylene copolymer and poly(4-methylpentene-1); polystyrene, polyamide, polyethylene terephthalate, a partial hydrolysis product of an ethylenevinyl acetate copolymer, an ethylene-acrylic acid copolymer or a salt thereof, a vinylidene chloride copolymer, e.g., a vinyl chloride-vinylidene chloride copolymer; a vinyl-chloride-alkyl acrylate copolymer; and mixtures of these resins. Polypropylene and polyethylene are preferred for their water resistance and chemical resistance. In using polypropylene as a base layer, it is preferred to incorporate therein 3 to 25% by weight, more preferably 4 to 20% by weight, of a thermoplastic resin whose melting point is lower than polypropylene, such as polyethylene, polystyrene or an ethylene-vinyl acetate copolymer, in order to improve stretchability. These ranges include all values and subranges therebetween.

The fine inorganic powder which can be used in the above-described synthetic paper include calcium carbonate, calcined clay, silica, diatomaceous earth, talc, titanium oxide, and barium sulfate. These inorganic particles preferably have a particle size of 0.03 to 16 μm, more preferably 0.05 to 13 μm. These ranges include all values and subranges therebetween.

The stretch ratio of the microporous film is preferably 4 to 10 in either the machine direction or the transverse direction. The stretching temperature is 150 to 162° for a propylene homopolymer (melting point (m.p.): 164–167° C.); 110 to 120° C. for high-density polyethylene (m.p.: 121–124° C.); and 104 to 115° C. for polyethylene terephthalate (m.p.: 246–252° C.). The stretching speed is 50 to 350 m/min.

If the void content of the microporous stretched film is less than 5% substantial weight reduction of the synthetic paper as a substrate of the recording material cannot be expected. If it exceeds 50%, the stretched film has insufficient strength (tensile strength and flexural strength) for practical use. The thickness of the stretched film is 20 to 300 μm, more preferably 30–275 μm and most preferably 50–200 μm. These ranges include all values and subranges therebetween. Thinner stretched films fail to provide microporous synthetic paper. Thicker stretched film lead to an increase of cost of the recording material.

The coating composition of the present invention is applied to at least one side of the substrate by means of customary coaters, such as a bar coater, a die coater, an air knife coater, a gravure coater, etc.

Where the solvent content of the composition is small, the solvent may be removed through evaporation on irradiation with ionizing radiation. Otherwise, for example, where the solids content is small, a drying step is required before and/or after irradiation. A suitable drying temperature is 30 to 150° C., preferably 50 to 110° C. These ranges include all values and subranges therebetween.

The coating composition is applied to a solid coating weight of 0.1 to 50 g/m$^2$, preferably 1 to 20 g/m$^2$. These ranges include all values and subranges therebetween. If the coating weight is less than 0.1 g/m$^2$, the expected effect is hardly manifested. The greatest effect occurs at about 50 g/m$^2$, and a greater coating weight becomes less cost effective.

If desired, the wettability of the substrate or adhesion to the coating layer can be improved by subjecting the substrate to a pretreatment, such as primer coating, a corona discharge treatment, a radiation treatment, a plasma treatment, and a flame treatment.

The thus formed coating layer can be cured by ionizing radiations. Ionizing radiations include ultraviolet rays, electron beams, α-rays, β-rays, γ-rays, and X-rays. Ultraviolet rays are preferred from the standpoint of convenience of equipment.

The resulting coated recording material is useful in ink jet recording using aqueous or oily ink, hot-melt type ink jet recording, gravure printing, offset printing, and screen printing, giving clear prints with no color fading.

EXAMPLES

Having generally described this invention, a further understanding can be obtained by reference to certain specific examples which are provided herein for purposes of illustration only and are not intended to be limiting unless otherwise specified.

Example 1

In 100 g of isopropyl alcohol was dissolved 3.2 g of polyvinylpyrrolidone (K-90) by stirring, and 3.6 g of aluminum tri-sec-butoxide was dissolved therein. To the solution was added 0.15 g of water, followed by gentle stirring for 5 minutes to prepare a coating composition.

The coating composition was applied to a 200 μm thick transparent polyethylene terephthalate (PET) film of OHP in a nitrogen atmosphere by means of a table applicator bar, air-dried under ambient conditions for 5 minutes, and then dried in a hot-air drier at 90° C. for 5 minutes. The application of the coating composition and the following drying were repeated twice more to obtain a recording material having a coating layer.

Evaluation

Printing in Aqueous Ink Jet Recording

The coated side of the recording material was printed with yellow, magenta, cyan, and black ink on an aqueous ink jet printer (BJC-410J, manufactured by Canon Inc.). The time required for ink drying was 60 seconds at the longest.

After confirming that each color ink showed sufficient color development, the degree of ink running was observed with the naked eye and evaluated according to the following rating system. As a result, the prints were rated "A".

A . . . No ink running was observed.
B . . . Slight ink running was observed.
C . . . Much ink running was observed.

The results of the above evaluation are shown in Table 1 below.

Comparative Example 1

The transparent PET film used in Example 1 as a substrate was evaluated in terms of visible light transmission and printability in aqueous ink jet recording in the same manner as in Example 1. The printed ink did not dry even after being allowed to stand for 2 days, and the film blotted noticeably. The results of the evaluation are shown in Table 1.

Comparative Example 2

In 100 g of isopropyl alcohol was dissolved 3.2 g of polyvinylpyrrolidone (K-90) by stirring. The resulting binder solution was applied to the same PET film as used in Example 1 with a table bar coater under ambient conditions and dried, and the application and the drying were repeated three times in total to prepare a coated recording material. The coated recording material was tested in the same manner as in Example 1. The results obtained are shown in Table 1.

Comparative Example 3

In 100 g of isopropyl alcohol was dissolved in 3.2 g of polyvinylpyrrolidone (K-90) by stirring, and 5.0 g of alumina sol (Alumina Sol-10) was added and dissolved therein. A coated recording material was prepared in the same manner as in Comparative Example 1, except for using the resulting solution, and tested in the same manner as in Example 1. The results obtained are shown in Table 1.

Comparative Example 4

In 100 g of isopropyl alcohol was dissolved in 3.2 g of aluminum triisopropoxide, and 0.27 g of water was added thereto, followed by gentle stirring for 30 minutes. A coated recording material was prepared in the same manner as in Comparative Example 1, except for using the resulting solution. Because the coating layer partly fell off the substrate during handling due to brittleness, tests for evaluation were not carried out.

Example 2

In 100 g of isopropyl alcohol was dissolved 3.2 g of polyvinylpyrrolidone (K-90) by stirring, and 3.6 g of aluminum tri-sec-butoxide was dissolved therein. The resulting coating composition was applied to the same PET film as used in Example 1 by means of a bar coater, conditioned in a thermo-hygrostat set at 30° C. and 80% humidity for 1 hour, and dried in an oven at 90° C. for 5 minutes. The application of the coating composition, conditioning and drying were repeated twice more to obtain a recording material having a coating layer.

The resulting recording material was tested in the same manner as in Example 1. The results obtained are shown in Table 1.

Example 3

In 100 g of isopropyl alcohol was dissolved 3.2 g of polyvinylpyrrolidone (K-90) by stirring, and 1 g of ethyl acetoacetate and then 3.6 g of aluminum triisobutoxide were dissolved therein. To the solution was added 0.27 g of water followed by gentle stirring for 15 minutes to prepare a coating composition. The resulting coating composition was applied to the same PET film as used in Example 1 by means of a bar coater and dried in an oven at 90° C. for 5 minutes. The application of the coating composition, conditioning and drying were repeated three times in total to obtain a recording material having a coating layer.

The resulting recording material was tested in the same manner as in Example 1. The results obtained are shown in Table 1.

Example 4

In 100 g of isopropyl alcohol was dissolved 3.2 g of polyvinylpyrrolidone (K-90) by stirring, and 1.0 g of ethyl acetoacetate and then 3.6 g of aluminum tri-sec-butoxide were dissolved therein. In the solution was dissolved 3.7 g of 3-methacryloylpropyltrimethoxysilane. To the solution was added 0.27 g of water, followed by gentle stirring for 20 minutes to prepare a coating composition. The resulting coating composition was applied to the same PET film as used in Example 1 by means of a bar coater and dried. The application of the coating composition and drying were repeated three times in total to obtain a recording material having a coating layer.

The resulting recording material was tested in the same manner as in Example 1. The results obtained are shown in Table 1.

Example 6

In 100 g of isopropyl alcohol was dissolved 3.2 g of polyvinylpyrrolidone (K-90) by stirring, and 1.0 g of ethyl acetoacetate and then 3.6 g of aluminum tri-sec-butoxide were dissolved therein. Then, 3.7 of 3-methacryloylpropyltrimethoxysilane was dissolved therein. To the solution was added 0.27 g of water, followed by stirring for 30 minutes. To the mixture were further added 1.0 of 2-hydroxyethyl methacrylate, 1.5 g of ethylene glycol dimethacrylate, and 0.3 g of 1-hydroxycyclohexyl phenyl ketone (Irgacure 184) as a photo initiator to prepare a coating composition.

The coating composition was applied to the same PET film as used in Example 1 by means of a bar coater and dried. The application of the coating composition and drying were repeated three times in total, and the coating layer was cured by irradiation with ultraviolet rays from a high-pressure mercury lamp to obtain a recording material having a coating layer. The resulting recording material was tested in the same manner as in Example 1. The results obtained are shown in Table 2.

Example 7

A coated recording material was prepared and tested in the same manner as in Example 3, except for changing the amount of aluminum tri-sec-butoxide to 5.4 g. The results of the evaluation are shown in Table 2.

Example 8

A coated recording material prepared and tested in the same manner as in Example 3, except for changing the amount of polyvinylpyrrolidone to 5.0 g. The results of the evaluation are shown in Table 2.

TABLE 1

|  | Ex. 1 | Comp. Ex. 1 | Comp. Ex. 2 | Comp. Ex. 3 | Ex. 2 | Ex. 3 | Ex. 4 |
|---|---|---|---|---|---|---|---|
| Thickness of Recording Material (μm) | 225 | 200 | 224 | 225 | 225 | 224 | 224 |
| Dry Thickness of Coating Layer (μm) | 25 | — | 24 | 25 | 25 | 24 | 25 |
| Ink Drying Time (sec) | 35 | ≧2 days | 60 | 30 | 42 | 40 | 35 |
| Ink Running on Recording Material | A | C | C | A | A | A | A |

Example 5

In 100 g of isopropyl alcohol was dissolved in 3.2 g of polyvinylpyrrolidone (K-90) by stirring, and 1.0 g of ethyl acetoacetate and then 3.6 of aluminum tri-sec-butoxide were dissolved therein. In the solution were further dissolved 1.5 g of ethylene glycol dimethacrylate and 0.3 g of 1-hydroxycyclohexyl phenyl ketone (Irgacure 184) as a photo initiator. To the solution was added 0.27 of water, followed by gentle stirring for 20 minutes to prepare a coating composition.

The coating composition was applied to the same PET film as used in Example 1 by means of a wire coater and dried in an oven set at 90° C. The application of the coating composition and drying were repeated twice more to obtain a recording material having a coating layer. The resulting recording material was tested in the same manner as in Example 1. The results obtained are shown in Table 2 below.

Example 9

A coated recording material was prepared and tested in the same manner as in Example 3, except for changing the amount of ethyl acetoacetate to 0.5 g. The results of this evaluation are shown in Table 2.

Example 10

A coated recording material was prepared and tested in the same manner as in Example 4, except for changing the amount of 3-methacryloylpropyltrimethoxysilane to 2.0 g. The results of the evaluation are shown in Table 2.

Example 11

A coated recording material was prepared and tested in the same manner as in Example 5, except for changing the amounts of polyvinylpyrrolidone, ethylene glycol dimethacrylate, and 2-hydroxyethyl methacrylate to 2.6 g, 2.5 g, and 0.5 g, respectively. The results of the evaluation are shown in Table 3.

Example 12

A coated recording material was prepared and tested in the same manner as in Example 6, except for replacing the 3-methacryloylpropyltrimethoxysilane with 2.8 g of tetraethoxysilane and changing the amounts of ethylene glycol dimethacrylate and 2-hydroxyethyl methacrylate to 1.5 g and 0.5 g, respectively. The results of the evaluation are shown in Table 2.

C . . . Not more than 80% remained.

3) Evaluation on Water Resistance

A part of the printed recording material was immersed in a sufficient amount of tap water (25° C.) for 24 hours and then air-dried. The ink retention was observed with the naked eye and rated as follows.

AA . . . More than 95% remained.
A . . . More than 80 up to 95% remained.
B . . . More than 50 up to 80% remained.
C . . . Not more than 50% remained.

The results of Example 13 are shown in Table 3 below.

TABLE 2

|  | Example No. | | | | | | | |
| --- | --- | --- | --- | --- | --- | --- | --- | --- |
|  | 5 | 6 | 7 | 8 | 9 | 10 | 11 | 12 |
| Thickness of Recording Material ($\mu$m) | 224 | 225 | 230 | 229 | 225 | 226 | 224 | 228 |
| Dry Thickness of Coating Layer ($\mu$m) | 24 | 25 | 30 | 29 | 25 | 26 | 24 | 28 |
| Ink Drying Time (sec) | 48 | 39 | 38 | 55 | 40 | 50 | 45 | 35 |
| Ink Running on Recording Material | A | A | A | A | A | A | A | A |

Example 13

In 67.6 g of isopropyl alcohol was dissolved 4.36 g of polyvinylpyrrolidone (K-90, a trade name, produced by ISP Technology Inc.) by stirring, and 4.92 g of aluminum tri-sec-butoxide was dissolved therein. To the solution was added 0.15 g of water to conduct hydrolysis for 1 hour, and 0.7 g of a superabsorbent polymer (Sanfresh ST-100SP, a trade name, produced by Sanyo Chemical Industries, Ltd.) was added thereto to prepare a coating composition.

The coating composition was applied to synthetic paper Yupo PG-150 (a trade name of propylene resin stretched film having a thickness of 150 $\mu$m, produced by Oji-Yuka Synthetic Paper Co., Ltd.) in a nitrogen atmosphere by means of a table applicator bar, air-dried under ambient conditions for 5 minutes, and then dried in a hot-air drier at 90° C. for 5 minutes. The application of the coating composition and the following drying were repeated three more times to obtain a recording material having a coating layer.

1) Evaluation of Printability in Aqueous Ink Jet Recording

The coated side of the recording material was printed with yellow, magenta, cyan, and black aqueous inks on an aqueous ink jet printer (Model PM-700C, manufactured by Epson). The time required for ink drying was 60 seconds at the longest.

After confirming that each color ink showed sufficient color development, the degree of ink was observed with the naked eye and evaluated according to the following rating system. As a result, the prints were rated "A".

A . . . No ink running was observed.
B . . . Slight ink running was observed.
C . . . Much ink running was observed.

2) Evaluation on Coating Layer Strength

An adhesive tape (Cello-Tape, produced by Nichiban Co., Ltd.) was firmly stuck onto the print and then peeled at a peel angle of 45°. The ink retention (the percentage of the ink remaining on the recording material) was observed with the naked eye and rated as follows.

A . . . More than 95% remained.
B . . . More than 80 up to 95% remained.

Comparative Example 5

The synthetic paper Yupo FPG-150 used in Example 13 (as uncoated) was subjected to the same test of printability as in Example 13. The printed ink did not dry even when left to stand for 3 days, and the paper blotted noticeably. The results obtained are shown in Table 3.

Comparative Example 6

In 67.6 g of isopropyl alcohol was dissolved 4.36 g of polyvinylpyrrolidone (K-90) by stirring. The resulting binder solution was applied to synthetic paper Yupo FPG-150 with a table bar coater under ambient conditions and dried, and the application and the drying were repeated three times in total to prepare a coated recording material. The coated recording material was tested in the same manner as in Example 13. The results obtained are shown in Table 3.

Comparative Example 7

In 67.6 g of isopropyl alcohol was dissolved 4.36 of polyvinylpyrrolidone (K-90) by stirring, and 6.0 g of alumina sol (Alumina Sol-10, a trade name, produced by Kawaken Fine Chemical) was added and dissolved therein.

A recording material was prepared in the same manner as in Comparative Example 6, except for using the resulting solution, and tested in the same manner as in Example 13. The results obtained are shown in Table 3.

Comparative Example 8

In 67.6 g of isopropyl alcohol was dissolved 4.41 g of aluminum triisopropoxide, and 0.30 g of water was added thereto, followed by gentle stirring for 1 hour.

A recording material was prepared in the same manner as in Comparative Example 6, except for using the resulting solution. Because the coating layer partly fell off the substrate during handling due to brittleness, tests for evaluation were not carried out.

Example 14

In 67.6 g of isopropyl alcohol was dissolved 4.36 g of polyvinylpyrrolidone (K-90) by stirring, and 4.41 g of aluminum triisobutoxide was dissolved therein. To the solution was added 0.7 of a superabsorbent polymer (Sanfresh ST-100SP) to prepare a coating composition.

The coating composition was applied to synthetic paper Yupo PG-150 by means of a bar coater, conditioned in a thermo-hygrostat set at 30° C. and 80% humidity for 1 hour, and dried in an oven set at 90° C. for 5 minutes. The application of the coating composition, conditioning and drying were repeated three more times to obtain a recording material having a coating layer.

The resulting recording material was tested in the same manner as in Example 13. The results obtained are shown in Table 3.

Example 15

In 67.6 g of isopropyl alcohol was dissolved 4.36 g of polyvinylpyrrolidone (K-90) by stirring, and 1.30 g of ethyl acetoacetate and then 4.92 of aluminum tri-sec-butoxide were dissolved therein. To the solution was added 0.15 g of water to conduct hydrolysis for 1 hour. To the reaction mixture was further added 0.7 g of a superabsorbent polymer (Sanfresh ST-100SP) to prepare a coating composition.

The coating composition was applied to synthetic paper Yupo PG-150 by means of a bar coater and dried in an oven set at 90° C. for 5 minutes. The application of the coating composition and drying were repeated three times to obtain a recording material having a coating layer. The resulting recording material was tested in the same manner as in Example 13. The results obtained are shown in Table 3.

Example 16

In 67.6 g of isopropyl alcohol was dissolved 4.36 g of pqlyvinylpyrrolidone (K-90) by stirring, and 1.30 g of ethyl acetoacetate and then 4.92 g of aluminum tri-sec-butoxide were dissolved therein. To the solution was added 0.15 g of water to conduct hydrolysis for 1 hour. In the reaction mixture were further dissolved 3.0 g of an acrylate oligomer (Photomer 5018, a trade name, produced by San-Nopco Co., Ltd.), 0.7 g of a superabsorbent polymer (Sanfresh ST-100SP), and 0.3 g of 1-hydroxycyclohexyl phenyl ketone (Irgacure 184, a trade name, produced by Chiba-Geigy (Japan) Ltd.) as a photo initiator to prepare a coating composition.

The coating composition was applied to synthetic paper Yupo PG-150 by means of a bar coater and dried. The application of the coating composition and drying were repeated three times to form a coating layer, which was cured by irradiation with ultraviolet rays from a high-pressure mercury lamp to obtain a recording material having a coating layer. The resulting recording material was tested in the same manner as in Example 13. The results obtained are shown in Table 3.

Example 17

In 67.6 g of isopropyl alcohol was dissolved 4.36 g of polyvinylpyrrolidone (K-90) by stirring, and 1.30 g of ethyl acetoacetate and then 4.41 g of aluminum triisobutoxide were dissolved therein. To the solution was added 0.15 g of water to conduct hydrolysis for 1 hour. Thereafter, 1.2 g of 2-hydroxyethyl methacrylate and 1.7 g of ethylene glycol dimethacrylate were added thereto, and 0.7 g of a superabsorbent polymer (Sanfresh ST-100SP) and 0.3 g of 1-hydroxycyclohexyl phenyl ketone (Irgacure 184) as a photo initiator were dissolved therein to prepare a coating composition.

The coating composition was applied to synthetic paper Yupo PG-150 by means of a bar coater and dried. The application of the coating composition and drying were repeated three times to form a coating layer, which was cured by irradiation with ultraviolet rays from a high-pressure mercury lamp to obtain a recording material having a coating layer. The resulting recording material was tested in the same manner as in Example 13. The results obtained are shown in Table 3.

TABLE 3

|  | Ex. 13 | Comp. Ex. 5 | Comp. Ex. 6 | Comp. Ex. 7 | Comp. Ex. 8 | Ex. 14 | Ex. 15 | Ex. 16 | Ex. 17 |
| --- | --- | --- | --- | --- | --- | --- | --- | --- | --- |
| Thickness of Recording Material ($\mu$m) | 180 | 150 | 178 | 180 | 176 | 180 | 177 | 176 | 180 |
| Dry Thickness of Coating Layer ($\mu$m) | 30 | — | 28 | 30 | 26 | 30 | 27 | 26 | 30 |
| Ink Drying Time (sec) | 55 | ≧3 days | 200 | 120 | — | 60 | 70 | 57 | 50 |
| Ink Running on Recording Material | A | C | C | B | — | A | A | A | A |
| Coating Layer Strength | B | — | B | B | C | B | B | A | A |
| Water Resistance | A | — | B | B | C | A | A | AA | AA |

Effect of the Invention

The present invention provides a coating composition for a recording material for ink jet printers and a process for producing a recording material using the coating composition. The recording material coated with the coating composition of the present invention absorbs ink rapidly and exhibits satisfactory resistance to ink running and water.

This application is based on Japanese Patent Application No. Hei 9-181839, filed Jun. 24, 1997, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A coating composition comprising an aluminum alkoxide, a binder, and a hydrophilic solvent, wherein
   the binder is present in an amount of 2$\alpha$ to 8$\alpha$ parts by weight per 100 parts by weight of the aluminum alkoxide, wherein $\alpha$ represents 6000/(molecular weight of the aluminum alkoxide), and wherein
   the hydrophilic solvent is present in an amount of 900 to 4,000 parts by weight per 100 parts by weight of the aluminum alkoxide.

2. The coating composition according to claim 1, wherein the composition further comprises a superabsorbent polymer having an average particle size of 0.5 to 30 $\mu$m.

3. The coating composition according to claim 2, wherein the superabsorbent polymer is present in an amount of 0.1 to 150 parts by weight per 100 parts by weight of the aluminum alkoxide.

4. The coating composition according to claim 2, wherein the composition further comprises a stabilizer.

5. The coating composition according to claim 4, the composition further comprises a crosslinking agent in an amount of 0.2α to 40α parts by weight per 100 parts by weight of the aluminum alkoxide, wherein α represents 6000/(molecular weight of the aluminum alkoxide), said amount of the crosslinking agent being equal to or less than the amount of the binder.

6. The coating composition according to claim 5, wherein the composition further comprises 0.01 to 2 mol of water per mole of the aluminum alkoxide.

7. A recording material obtained by coating a substrate with a coating composition according to claim 6, followed by drying.

8. The coating composition according to claim 1, wherein the composition further comprises a stabilizer.

9. The coating composition according to claim 8, wherein the stabilizer is present in an amount of 0.005 to 1 mol per mole of the aluminum alkoxide.

10. The coating composition according to claim 1, wherein the composition further comprises 0.1 to 150 parts by weight of an alkoxysilane per 100 parts by weight of the aluminum alkoxide.

11. The coating composition according to claim 1, wherein the composition further comprises a crosslinking agent in an amount of 0.2α to 40α parts by weight per 100 parts by weight of the aluminum alkoxide, wherein α represents 6000/(molecular weight of the aluminum alkoxide), said amount of the crosslinking agent being equal to or less than the amount of the binder.

12. The coating composition according to claim 1,
wherein the composition further comprises a stabilizer, a crosslinking agent and alkoxysilane, and
wherein the amount of the alkoxysilane is 0.1 to 150 parts by weight per 100 parts by weight of the aluminum alkoxide, the amount of the crosslinking agent is 0.2α to 40α parts by weight per 100 parts by weight of the aluminum alkoxide, wherein α represents 6000/(molecular weight of the aluminum alkoxide), and the amount of the crosslinking agent is equal to or less than the amount of the binder.

13. The coating composition according to claim 1, wherein the composition further comprises 0.01 to 2 mol of water per mole of the aluminum alkoxide.

14. The coating composition according to claim 1,
wherein the composition further comprises a stabilizer, water and alkoxysilane, and
wherein the amount of the alkoxysilane is 0.1 to 150 parts by weight per 100 parts by weight of the aluminum alkoxide, and the amount of the water is 0.01 to 2 mol of water per mole of the aluminum alkoxide.

15. A recording material obtained by coating a substrate with a coating composition according to claim 14, followed by drying.

16. A recording material obtained by coating a substrate with a coating composition comprising an aluminum alkoxide, a binder, and a hydrophilic solvent, followed by drying wherein
the binder is present in an amount of 2 to 8 parts by weight per 100 parts by weight of the aluminum alkoxide, wherein represents 6000/(molecular weight of the aluminum alkoxide), and wherein,
the hydrophilic solvent is present in an amount of 900 to 4,000 parts by weight per 100 parts by weight of the aluminum oxide.

17. A process for producing a recording material comprising coating a substrate with a coating composition comprising an aluminum alkoxide, a binder, and a hydrophilic solvent and by drying the coating composition wherein
the binder is present in an amount of 2 to 8 parts by weight per 100 parts by weight of the aluminum alkoxide, wherein represents 6000/(molecular weight of the aluminum alkoxide), and wherein,
the hydrophilic solvent is present in an amount of 900 to 4,000 parts by weight per 100 parts by weight of the aluminum oxide.

18. A coating composition comprising an aluminum alkoxide, a binder, a hydrophilic solvent, and 0.1 to 150 parts by weight of an alkoxysilane per 100 parts by weight of the aluminum alkoxide.

19. A coating composition comprising an aluminum alkoxide, a binder, a hydrophilic solvent, a stabilizer, water and an alkoxysilane,
wherein the amount of the alkoxysilane is 0.1 to 150 parts by weight per 100 parts by weight of the aluminum alkoxide, and the amount of the water is 0.01 to 2 mol of water per mole of the aluminum alkoxide.

* * * * *

UNITED STATES PATENT AND TRADEMARK OFFICE
CERTIFICATE OF CORRECTION

PATENT NO.   : 6,001,165
DATED        : December 14, 1999
INVENTOR(S)  : Nobuhiro SHIBUYA et al It is certified that error appears in the above-identified patent and that said Letters Patent is hereby corrected as shown below:

Column 22, line 15, "of 2 to 8 parts" should read --2α to 8α parts--.
Column 22, line 17, "wherein represents" should read --wherein α represents--.
Column 22, line 27, "of 2 to 8 parts" should read --2α to 8α parts--.
Column 22, line 29, "wherein represents" should read --wherein α represents--.

Signed and Sealed this

Twenty-fourth Day of April, 2001

Attest:

NICHOLAS P. GODICI

*Attesting Officer*    *Acting Director of the United States Patent and Trademark Office*